United States Patent [19]

Barberis

[11] Patent Number: 4,649,805

[45] Date of Patent: Mar. 17, 1987

[54] VEHICLE BRAKE APPLICATION APPARATUS

[75] Inventor: Dario Barberis, Turin, Italy

[73] Assignee: WABCO Westinghouse Compagnia Freni S.p.A., Turin, Italy

[21] Appl. No.: 683,772

[22] Filed: Dec. 19, 1984

[30] Foreign Application Priority Data

Dec. 21, 1983 [IT] Italy ................. 54065/83[U]

[51] Int. Cl.⁴ ............................................. F16J 1/20
[52] U.S. Cl. .................................. 92/129; 74/110; 188/343
[58] Field of Search ............ 92/129, 165 R, 178, 92/DIG. 1; 74/110; 188/343, 106 F, 72.6, 72.7

[56] References Cited

U.S. PATENT DOCUMENTS

| 2,569,707 | 10/1951 | Cardell | 74/110 X |
| 3,434,359 | 3/1969 | Williams et al. | 74/110 |
| 3,995,537 | 12/1976 | Severinsson | 92/129 |
| 4,337,690 | 7/1982 | Severinsson | 188/343 |

Primary Examiner—Robert E. Garrett
Assistant Examiner—Mark A. Williamson
Attorney, Agent, or Firm—J. O. Ray, Jr.

[57] ABSTRACT

A braking unit for vehicles is disclosed which includes a housing in which slides a piston that can be displaced by means of a pressurized fluid to control, by means of an actuator, a thrust rod which controls a brake shoe. The actuator includes at least one pair of coaxial rollers supported so that they can revolve around a pin, supported by a pair of legs, which is connected to the piston and displaced in rolling contact with inclined surfaces of the thrust rod.

12 Claims, 3 Drawing Figures

VEHICLE BRAKE APPLICATION APPARATUS

BACKGROUND OF THE INVENTION

The present invention relates in general to a fluid pressure responsive vehicle brake apparatus and, more particularly, the invention relates to an actuating mechanism for such brake apparatus that provides easy assembly thereof and fast response to fluid pressure application.

The invention to be described hereinafter is particularly useful on tramway-type vehicles and will be described in such application although it is not intended to be limited thereto.

Prior to the present invention, brake apparatus of this general type were known and taught in German Pat. No. 1,680,381 and in U.S. Pat. No. 3,995,537, the disclosures of which are incorporated herein by reference.

German Pat. No. 1,680,381 teaches a brake apparatus wherein a working surface parallel to a pair of wedge working surfaces is arranged on the brake push or thrust rod. A reaction surface parallel to each wedge working surface is provided in the brake unit housing. Positioned intermediate these coacting and parallel surfaces are roller means. With this design, even though the wedge-shaped working surface on the push rod and the working surfaces provided in the brake unit housing may be machined, it was difficult to maintain the rolling means in proper working positions between such surfaces. Furthermore, this particular brake apparatus design was comparatively large and cumbersome because it was found that such working surfaces on the push rod and within the housing were of necessity a length equal to one half the length of the wedge surfaces.

Some of the above difficulties were overcome with the brake apparatus taught in U.S. Pat. No. 3,995,537. This brake unit provides in a common housing, the upper part of which is formed as a cylinder, a fluid pressure actuated piston and a push or thrust rod, both of which are axially movable and arranged in a plane which are substantially perpendicular to each other. The push rod contains a driver sleeve arranged thereon through which forces may be transmitted from the sleeve to the push rod. At each end of the driver sleeve, a working roller is rotatably journalled in the housing of the brake unit at each side of the push rod.

The piston has attached thereto a fork-shaped wedge element placed astraddle the push rod and the driver sleeve so that each of its legs will extend down between the working roller and the reaction roller. Each leg has a reaction surface in the axial direction of the piston and cooperating with the reaction roller in addition to the working surface which is inclined in relation to the former surface and cooperating with the working roller.

A piston return spring is positioned between the piston and a spring support on the driver sleeve. The spring support has a pin which extends through the sleeve and into the push rod with a rounded end therein so that the rotational connection between these two parts may be removed at the manual turning of the push rod by means of a nut.

A push rod return spring is arranged between the housing and the drive sleeve.

Each of the above described brake units have a common disadvantage in the complexity of assembly thereof which adds considerably to the cost and maintenance.

SUMMARY OF THE INVENTION

The present invention teaches a pressurized fluid operated brake unit. The brake unit includes a housing having a piston positioned within a bore of a first portion of such housing to reciprocally move therein. A thrust rod is positioned within a second portion of the housing with one end thereof extending through a wall thereof. The thrust rod is also reciprocally movable within the second portion of such housing in a direction substantially perpendicular to the piston. A first pair of linearly tapered abutment surfaces are carried by the thrust rod on diametrically opposed sides thereof. A piston alignment means is positioned within the housing for maintaining the piston in axial alignment during such reciprocal movement of the piston. The piston has a pair of legs which extend therefrom to a position straddling the diametrically opposed sides of the thrust rod, and a first pair of coaxial rollers are rotatably connected to the pair of legs for abutting engagement with a respective adjacent surface of the first pair of abutment surfaces carried by the thrust rod.

OBJECTS OF THE INVENTION

It is, therefore, one of the primary objects of the invention to provide a vehicle brake application apparatus that is relatively simple to assemble.

Another object of the present invention is to provide a vehicle brake application apparatus that includes means to provide a rapid initial thrust of such vehicle brake.

A further object of the present invention is to provide a vehicle brake application apparatus in which a manual brake setting means can be easily incorporated therein.

These and various other objects and advantages of the present invention will become more readily apparent to those persons skilled in the vehicle braking art from the following more detailed description when such description is taken in conjunction with the attached drawings.

BRIEF DESCRIPTION OF THE INVENTION

Figure 1:
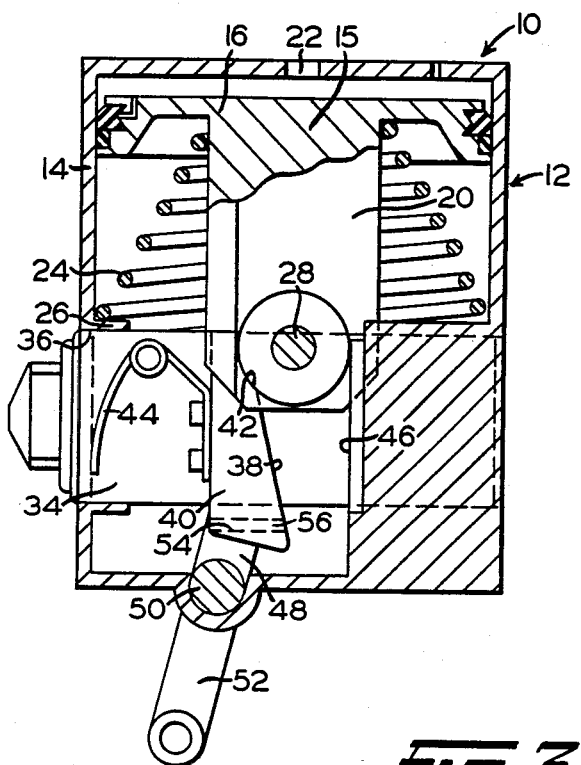
FIG. 1 is a schematic vertical view, partially in cross-section, of the presently preferred embodiment of the brake application apparatus constructed according to the invention.
Figure 3:
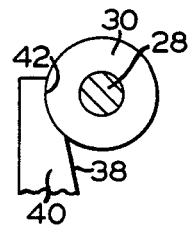
FIG. 3 is an enlarged view of the means for providing an initial rapid thrust to such brake application apparatus.

When referring to the drawings, like reference numbers have been used to identify identical parts throughout the several views.

In the drawings, the number 10 generally indicates the brake application apparatus of the present invention which includes a housing 12 which is presently preferably essentially cylindrical in shape, and designed to be attached to a support structure of a vehicle (not shown) in proximity to a wheel (not shown) of the vehicle. Although the invention is not limited thereto, it is particularly useful on a rapid transit railway vehicle such as a tramway vehicle.

Further, in the following description, the terms upper and lower, vertical and horizontal, etc. are understood as referring to the device 10 when mounted in the housing 12 on a tramway vehicle, corresponding to the position illustrated in the drawings. It is clear, however, that the unit 10 could also be mounted in other configurations.

The upper portion of the housing 12 defines a cylinder 14, in which there is a sliding piston 16, the lower end of which is constructed as a piece with a stem 15 having a pair of legs 18 and 20 attached thereto. The upper portion of the cylinder 14, and that between the piston 16 and the top of the housing 12, communicates with a passage 22 destined to be connected to a source of pressurized fluid, normally compressed air.

In the lower portion of the cylinder 14 is housed a spiral compression spring 24, the narrow end of which is held against the lower surface of the piston 16, and the wide end of which presses against an internal annular shoulder 26 of the housing 12.

From the lower end of the legs 18 and 20, two diametrically-opposite pins 28 project, each of which supports, in a revolving manner, an internal roller 30 and an external roller 32, with some axial distance between them. In the lower portion of the housing 12, and that below the cylinder 14, there is a thrust rod 34 which slides in a direction orthogonal to the direction of displacement of the piston 16 and the axis of the pins 28. The thrust rod 34, which can be equipped with an internal group of components (not shown) to take up the braking play, projects at one end thereof outside the housing 12 through a lateral opening 36 in such housing 12, and can be connected to a brake shoe or pad, not shown in the drawings, designed to interact with the peripheral surface of a tramway vehicle wheel (not shown).

The thrust rod 34 is equipped with two inclined thrust surfaces 38, projecting laterally from opposite parts, and with which the two internal rollers 30 supported by the legs 18 and 20 are in rolling contact. The two inclined thrust surfaces 38 are preferably carved out of the two lateral projections 40 which are integral with the thrust rod 34, and which exhibit, on the upper portion, initially concave stretches 42 having a radius of curvature corresponding substantially to that of the rollers 30. The function of the curved initial stretches 42 is, as will be explained below, to execute a rapid initial displacement of the thrust rod 34 during the latter's braking stroke.

Between the surfaces of the lateral projections 40, opposite the two inclined thrust surfaces 38 and the zones facing it of the housing 12, are interposed two retaining springs 44.

The two external rollers 32 are placed in rolling contact with two plane vertical reaction surfaces 46 of the housing 12 facing the two inclined thrust surfaces 38 and oriented, with respect to a plane containing the axis of the stem 15 and the axis of the pins 28, by the opposite part with respect to the thrust surfaces 38.

Figure 2:
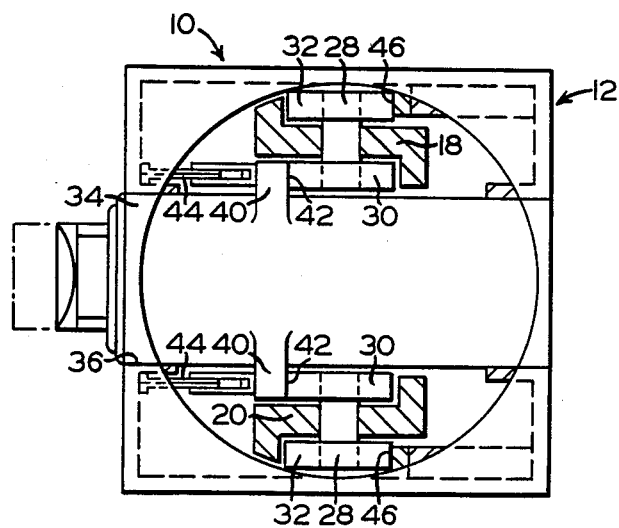
FIG. 2 is a schematic horizontal view, also partially in cross-section, of the brake application apparatus shown in FIG. 1.

As is clearly visible in FIG. 2, the housing 12 exhibits the two vertical legs 18 and 20, by means of which the portions of the pins 28 between the respective rollers 30 and 32 are engaged, to guide the vertical displacement of the piston 16.

The operation of the braking unit, according to the invention, will be described below.

The drawings illustrate the condition of the unit at rest, corresponding to the absence of pressure in the upper portion of the cylinder 14. In this condition, the piston 16 and therefore the legs 18 and 20 with the rollers 30 and 32 are in the raised position, with the internal rollers 30 arranged in correspondence to the initial concave arcuate portions 42 of the inclined thrust surfaces 38 and the external rollers 32 in contact with the upper extremities of the reaction surfaces 46.

By admitting compressed air to the upper portion of the cylinder 14, via the passage 22, the braking stroke of the thrust rod 34 is executed, namely the bringing together of the peripheral surface of the wheel and the brake shoe or pad controlled by the rod 34. In this case, the action of the compressed air causes the displacement toward the bottom of the piston 16 and the legs 18 and 20 and, by means of the rollers 32 against the reaction surfaces 46 and the rollers 30 against the inclined thrust surfaces 42, the sliding of the thrust rod 34 in the direction perpendicular to the direction of displacement of the piston 16, through the opening 36. Thanks to the presence of the initial arcuate stretches 42 of the thrust surfaces 42, at the beginning of the work stroke of the piston 16, there is an initial phase where the brake shoe is rapidly brought close to the wheel. The braking stroke then continues gradually, thanks to the rolling contact between the rollers 30, 32 and the surfaces 46, 42, in this manner achieving a gradual braking action.

By reducing the pressure in the upper portion of the cylinder 14, there is a return of the piston 16 and of the thrust rod 34 toward the respective initial positions, thanks to the action of the retaining springs 20 and 44.

The braking unit described by the invention can also be provided with a manual control device for the application of the parking brake, including a lever 48 articulated around a pin 50 located in the lower portion of the housing 12 and having an external activating arm 52 and an internal arm including a toothed section 54 engaging a horizontal rack 56 on the lower portion of the thrust rod 34. The rack 56 is preferably an integral part of the thrust rod 34, for example corresponding to the lower end of one of the lateral projections 40.

From the above description, it is apparent that other modifications of the braking unit described by the invention can be made without departing from the spirit and scope of the attached claims.

Having now described the invention, what I claim as new and desire to secure by Letters Patent, is:

1. A fluid pressure responsive apparatus to apply a vehicle brake, said apparatus comprising:
    (a) a housing;
    (b) a piston positioned within a bore of a first portion of said housing to reciprocally move therein;
    (c) a thrust rod positioned within a second portion of said housing with one end thereof extending through a wall of said housing, said thrust rod reciprocally movable within said second portion of said housing in a direction substantially perpendicular to said piston;
    (d) a first pair of linearly tapered abutment surfaces carried by said thrust rod on diametrically opposed sides thereof;
    (e) a second pair of abutment surfaces carried by said housing in a position facing said first pair of abutment surfaces;
    (f) a second pair of coaxial rollers rotatably connected to said pair of legs axially opposite said first pair of coaxial rollers for abutting engagement with a respective adjacent surface of said second pair of abutment surfaces carried by said housing;
    (g) said piston having a pair of legs extending therefrom to a position straddling said diametrically opposed sides of said thrust rod, said pair of legs being spaced substantially equidistant from a first plane which intersects said piston substantially through its center and said pair of legs having substantially equal portions positioned on opposite sides of a second plane which intersects said piston substantially in said center and is perpendicular to said first plane; and (h) a first pair of coaxial rollers rotatably connected to said pair of legs for abutting engagement with a respective adjacent surface of said first pair of abutment surfaces carried by said thrust rod.

2. A fluid pressure responsive vehicle brake apparatus, according to claim 1, wherein each of said first pair of linearly tapered abutment surfaces further includes an arcuate portion adjacent one end which engages a respective roller of said pair of coaxial rollers when such vehicle brake is in a release position for providing an initial rapid thrust of said thrust rod during an application stroke of such vehicle brake when one side of said piston is subjected to a predetermined fluid pressure.

3. A fluid pressure responsive vehicle brake apparatus, according to claim 2, wherein said arcuate portion has a radius substantially the same as the outer radius of said first pair of coaxial rollers.

4. A fluid pressure responsive vehicle brake apparatus, according to claim 1, wherein said first pair of linearly tapered abutment surfaces are formed integral with said thrust rod as a single piece.

5. A fluid pressure responsive vehicle brake apparatus, according to claim 1, wherein said brake apparatus further includes a manual brake means engageable with said thrust rod for manually setting such vehicle brake.

6. A fluid pressure responsive vehicle brake apparatus, according to claim 5, wherein said manual brake means comprises:

(a) a horizontally disposed rack along an edge of said first pair of abutment surfaces; and (b) a lever means articulated around a pivot pin and having a toothed section engageable with said rack for manually moving said thrust rod outwardly from said housing to apply such vehicle brake.

7. A fluid pressure responsive apparatus to apply a vehicle brake, said apparatus comprising:

(a) a housing;

(b) a piston postioned within a bore of a first portion of said housing to reciprocally move therein;

(c) a thrust rod postioned within a second portion of said housing with one end thereof extending through a wall of said housing, said thrust rod reciprocally movable within said second portion of said housing in a direction substantially perpendicular to said piston;

(d) a first pair of linearly tapered abutment surfaces carried by said thrust rod on diametrically opposed sides thereof;

(e) a second pair of abutment surfaces carried by said housing in a position facing said first pair of abutment surfaces;

(f) said piston having a pair of legs extending therefrom to a position straddling said diametrically opposed sides of said thrust rod;

(g) a first pair of coaxial rollers rotatably connected to said pair of legs for abutting engagement with a respective adjacent surface of said first pair of abutment surfaces carried by said thrust rod; and (h) a second pair of coaxial rollers rotatably connected to said pair of legs axially opposite said first pair of coaxial rollers for abutting engagement with a respective adjacent surface of said second pair of abutment surfaces carried by said housing.

8. A fluid pressure responsive vehicle brake apparatus, according to claim 7, wherein each of said first pair of linearly tapered abutment surfaces further includes an arcuate portion adjacent one end which engages a respective roller of said pair of coaxial rollers when such vehicle brake is in a release position for providing an initial rapid thrust of said thrust rod during an application stroke of such vehicle brake when one side of said piston is subjected to a predetermined fluid pressure.

9. A fluid pressure responsive vehicle brake apparatus, according to claim 8, wherein said arcuate portion has a radius substantially the same as the outer radius of said first pair of coaxial rollers.

10. A fluid pressure responsive vehicle brake apparatus, according to claim 7, wherein said first pair of linearly tapered abutment surfaces are formed integral with said thrust rod as a single piece.

11. A fluid pressure responsive vehicle brake apparatus, according to claim 7, wherein said brake apparatus further includes a manual brake means engageable with said thrust rod for manually setting such vehicle brake.

12. A fluid pressure responsive vehicle brake apparatus, according to claim 11, wherein said manual brake means comprises:

(a) a horizontally disposed rack along an edge of said first pair of abutment surfaces; and (b) a lever means artuculated around a pivot pin and having a toothed section engageable with said rack for manually moving said thrust rod outwardly from said housing to apply such vehicle brake.

* * * * *